United States Patent
Nemoto

(10) Patent No.: US 6,632,565 B2
(45) Date of Patent: *Oct. 14, 2003

(54) LITHIUM SECONDARY BATTERY

(75) Inventor: Hiroshi Nemoto, Nagoya (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,821

(22) Filed: Mar. 5, 1999

(65) Prior Publication Data

US 2002/0061439 A1 May 23, 2002

(30) Foreign Application Priority Data

Mar. 11, 1998 (JP) .......................... 10-059288

(51) Int. Cl.⁷ .......................... H01M 4/58; H01M 4/50; H01M 2/16; H01M 4/60
(52) U.S. Cl. ............... 429/218.1; 429/224; 429/231.95; 429/199; 429/248
(58) Field of Search .......................... 429/218.1, 231.9, 429/199, 224, 231.95, 248

(56) References Cited

U.S. PATENT DOCUMENTS

| | | | |
|---|---|---|---|
| 3,864,168 A | | 2/1975 | Casy, Jr. et al. |
| 4,287,269 A | * | 9/1981 | Coetzer et al. ............. 429/103 |
| 4,557,858 A | * | 12/1985 | Galloway ................... 252/508 |
| 4,830,938 A | * | 5/1989 | McCullough et al. ....... 429/149 |
| 5,474,858 A | | 12/1995 | Meritt |
| 5,707,756 A | * | 1/1998 | Inoue et al. .................. 429/57 |
| 5,707,760 A | * | 1/1998 | Stux et al. ................... 429/188 |
| 5,728,489 A | * | 3/1998 | Gao et al. .................... 429/192 |

FOREIGN PATENT DOCUMENTS

| | | | |
|---|---|---|---|
| EP | 0 075 132 | 3/1983 | |
| JP | 57-084571 | 5/1982 | |
| JP | 59-009874 | 1/1984 | |
| JP | 61-039464 | 2/1986 | |
| JP | 2-144860 | * 6/1990 | .......... H01M/10/40 |
| JP | 05-315006 | 11/1993 | |
| JP | 07-073883 | 3/1995 | |
| JP | 07-262999 | 10/1995 | |
| JP | 08-031407 | 2/1996 | |
| JP | 09-139232 | 5/1997 | |

OTHER PUBLICATIONS

Patent Abstracts of Japan vol. 096, No. 002, Feb. 29, 1996 & JP 07 262999 A (Toppan Printing Co Ltd), Oct. 13, 1995.

Patent Abstracts of Japan vol. 008, No. 194 (E–264), Sep. 6, 1984 & JP 59 081869 A (Hitachi Maxell KK), May 11, 1984.

(List continued on next page.)

*Primary Examiner*—Patrick Ryan
*Assistant Examiner*—Julian Mercado
(74) *Attorney, Agent, or Firm*—Burr & Brown

(57) ABSTRACT

A lithium secondary battery uses an organic electrolyte solution and includes a battery case, an internal electrode body contained in a battery case and including a positive electrode, a negative electrode and a separator made of porous polymer. The positive electrode and the negative electrode are wound or laminated so that the positive electrode and negative electrode are not brought into direct contact with each other via the separator. A zeolite having a moisture absorption characteristic, has been incorporated in the battery case so that the zeolite is brought into contact with the organic electrolyte solution within the battery case. The lithium secondary battery achieves suppression of deterioration of a charge-discharge cycle characteristic of a battery caused by decomposition of an electrolyte by limiting moisture mixed into an organic electrolyte solution to a considerably lower level as well as improvement of its self-discharge characteristic.

7 Claims, 2 Drawing Sheets

OTHER PUBLICATIONS

Patent Abstracts of Japan vol. 097, No. 009, Sep. 30, 1997 & JP 09 134720 A (Toyota Central Res & Amp;Dev Lab Inc), May 20, 1997.

Patent Abstracts of Japan vol. 095, No. 010, Nov. 30, 1995 & JP 07 192775 A (Sony Corp), Jul. 28, 1995.

Patent Abstracts of Japan vol. 097, No. 010, Oct. 31, 1997 & JP 09 161773 A (Yazaki Corp), Jun. 20, 1997.

Patent Abstracts of Japan vol. 011, No. 117 (E–498), Apr. 11, 1987 & JP 61 264682 A (Matsushita Electric Ind Co Ltd), Nov. 22, 1986.

Patent Abstracts of Japan vol. 011, No. 117 (E–498), Apr. 11, 1987 & JP 61 264679 A (Matsushita Electric Ind Co Ltd), Nov. 22, 1986.

Patent Abstracts of Japan vol. 097, No. 011, Nov. 28, 1997 & JP 09 192486 A (Mazda Motor Corp), Jul. 29, 1997.

Patent Abstracts of Japan vol. 018, No. 672 (E–1646), Dec. 19, 1994 & JP 06 267593 A (Yuasa Corp), Sep. 22, 1994.

* cited by examiner

LITHIUM SECONDARY BATTERY

BACKGROUND OF THE INVENTION AND RELATED ART STATEMENT

The present invention relates to a lithium secondary battery which achieves suppression of deterioration in the charge-discharge cycle characteristic of a battery caused by decomposition of an electrolyte by limiting the moisture mixed in an organic electrolyte solution to a considerably lower level as well as to improvement of its self-discharge characteristic.

In recent years, realization of practical use of lithium secondary batteries is being planned, as secondary batteries with a large energy density, and which can be used as a power source for electric equipment that is small, such as portable communication devices and notebook-sized personal computers. Moreover, concerns about resource saving and energy saving are raised in the background to international protection of the earth's environment, which is one of the reasons why the lithium secondary battery is expected to serve as a motor drive battery for electric vehicles and hybrid electric vehicles, which are under consideration for active introduction on the market in the automobile industry, etc. Thus, it is eagerly desired to put large capacity lithium secondary batteries, suitable for these uses into early practical use.

In a lithium secondary battery, a lithium transition metal compound oxide or the like is used as a positive active material, while a carbon material such as hard carbon or graphite is used as a negative active material. Upon charging, lithium ions in the positive active material are transferred to and captured by the negative active material through an electrolyte solution obtained by dissolving a lithium electrolyte in a nonaqueous organic solvent. In discharging, the reverse battery reaction occurs.

Here, as an organic electrolyte solution, the carbonic acid ester family such as ethylene carbonate (EC), diethyle carbonate (DEC), or dimethyle carbonate (DMC), is mainly used, while as an electrolyte, lithium fluoride complex compounds, particularly $LiBF_4$, $LiPF_6$, $LiAsF_6$, $LiSbF_6$, etc. are used. It is known that these electrolytes dissolve well into the aforementioned organic solvent, and show relatively high ionic conductivity.

However, the above-mentioned electrolytes are highly hygroscopic, and there are those, like $LiPF_6$, which decompose due to moisture absorption. In addition, these electrolytes are handled carefully in a dry nitrogen atmosphere, etc. since many of them do not dehydrate easily once they have been moisturized, even if it does not result in decomposition.

Even if the electrolytes are strictly controlled, however, when moisture exists in the electrolyte solution, this moisture causes decomposition of electrolytes. For example, in the case where $LiPF_6$ is adopted as an electrolyte, its decomposition separates out HF (hydrogen fluoride) so that HF affects the positive active material to elute a transition metal in the positive active material. Thus, battery capacity decreases due to a chemical change in the positive active material, causing problems such as deterioration of the charge-discharge cycle characteristic.

The control of moisture contained in such an electrolyte solution requires not only quality control by the manufacturer, etc., producing the electrolyte solutions but also strict control at the site where batteries are assembled. Since other battery parts, e.g. the battery case, electrodes, electrode active material, etc., are usually handled under an air atmosphere prior to assembly, the moisture absorbed into these parts will come out and mix with the electrolyte solution.

Furthermore, the present inventors have obtained an experimental result in which mixing of moisture into the inside of a battery affects the self-discharge characteristic badly. FIG. 4, shows the self-discharge characteristic captured according to changes in open circuit voltage in case where the experimental coin cells were formed under various conditions using an electrolyte solution in which $LiPF_6$ was dissolved in a mixed solvent of EC and DEC. Having been left alone after full charging, a battery D, which was formed and charged inside a globe box replaced with and filled with dry nitrogen, shows the least self-discharge, while a battery A, which was formed inside a similar globe box, and was thereafter charged inside a tight box containing a silica gel, proceeds with self-discharge a little bit faster than the battery D.

In comparison with the above, a battery B, which was charged in a tight box which was assembled in an air atmosphere and in which silica gel was put, showed a steep voltage decrease in about half the time of the battery D or the battery A, spends, and in addition, a battery C, which was formed inside said globe box using an electrolyte solution where water drops were intentionally added, and charged within said tight box, showed a steep voltage drop immediately after finishing the charge. It may thus be considered that the moisture within a battery greatly affects the self-discharge characteristic.

Therefore, there is a possibility that the admixture of moisture takes place not only from the materials with which the above-mentioned battery and each member are made, but also from the mixture of moisture inside a battery under the environment where a battery is being produced. Usually, to avoid such an event, the assembly of a battery is performed under a dry nitrogen atmosphere, etc., resulting in, however, considerable cost for production facilities to produce large-capacity large-sized lithium secondary batteries under such an atmosphere.

SUMMARY OF THE INVENTION

The present invention was achieved, considering the problems of the prior art mentioned above, the purpose of which is to provide a lithium secondary battery that removes moisture that mixes easily within the battery and that has a good charge-discharge cycle characteristic and a self-discharge characteristic without requiring large-scale production facilities.

That is, according to the present invention, a lithium secondary battery comprising a battery case, an internal electrode body contained in the battery case and including a positive electrode, a negative electrode and a separator film made of porous polymer, the positive electrode and the negative electrode being wound or laminated so that the positive electrode and negative electrode are not brought into direct contact with each other via the separator film, an organic electrolyte solution contained in the battery case, and a zeolite having a moisture absorption characteristic, having been incorporated in the battery case so that the zeolite is brought into contact with the organic electrolyte solution within the battery case.

In a lithium secondary battery of the present invention, it is preferred that the zeolite be incorporated in the battery case, using at least one of the following means, namely: (1) a means to dispose the zeolite to be contained in a bag permeable to electrolyte solution inside the battery case, (2)

a means to mix the zeolite with an electrode active material structuring the positive electrode and/or the negative electrode, (3) a means to disperse the zeolite on the surface of the separator film, and (4) a means to make the zeolite into a fine powder and to disperse it by suspension in the electrolyte solution. Thus, it is also preferred to use these means together in plurality.

Here, as the zeolite, the zeolite of an aluminosilicate family having at least a structure of the LTA type, FAU type, CHA type, or MOR type, and having an Al/Si ratio in the zeolite frame equal to or less than 10, is preferably used. Such zeolite does not contribute to battery reaction and exhibits a good moisture absorption under low moisture pressure.

DETAILED DESCRIPTION OF PREFERRED EMBODIMENT

According to the lithium secondary battery of the present invention, deterioration of the charge-discharge cycle characteristic of a battery due to decomposition of electrolyte is suppressed and the self-discharge characteristic is improved since the moisture in the organic electrolyte solution is limited to a considerably low level.

While the embodiments of the present invention are described below, it goes without saying that the present invention is not limited to the following embodiments.

Figure 1:
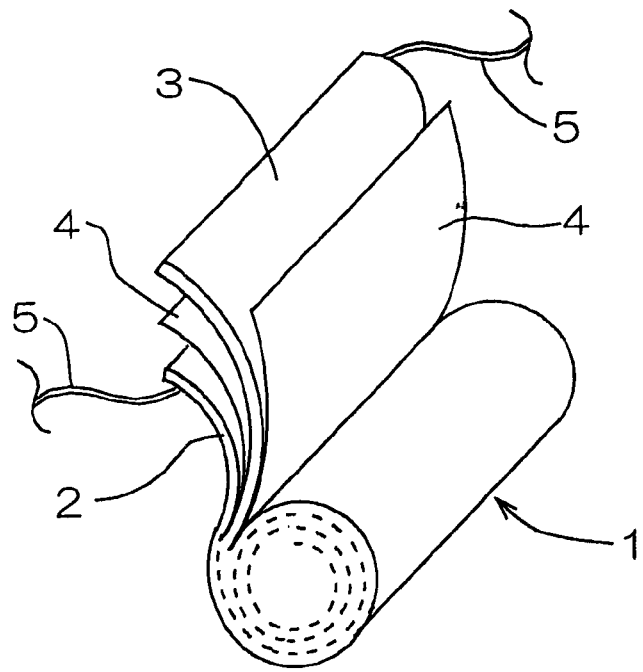
FIG. 1 is a perspective view showing the structure of a wound-type internal electrode body.

The internal electrode body of the lithium secondary battery of the present invention comprises a positive electrode, a negative electrode and a separator made of porous polymer film, the positive electrode and the negative electrode being wound or laminated so that the positive electrode and negative electrode are not brought into direct contact with each other via the separator. In particular, as shown in FIG. 1, an internal electrode body 1 of a winding type is produced by winding a positive electrode 2 and a negative electrode 3 having two sheets of separator 4 in between, with lead lines 5 provided for electrode 2 and 3 respectively.

Figure 2:
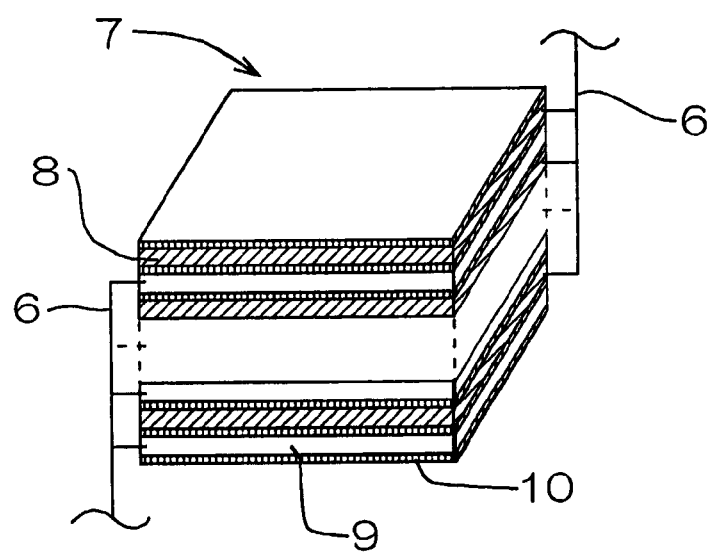
FIG. 2 is a perspective view showing one embodiment of the structure of a lamination-type internal electrode body.

On the other hand, the lamination-type internal electrode body 7 laminates the positive electrode 8 and the negative electrode 9 alternately via the separator 10 with lead lines 6 being connected to each of electrodes 8 and 9 respectively as shown in FIG. 2. Such internal electrode bodies 1, 7 are basically configured to have a plurality of element batteries being connected in parallel, an element battery consisting of positive electrodes and negative electrodes facing each other. Incidentally the positive electrodes 2, 8 and the negative electrodes 3, 9 are formed in the shape of a thin plate with an electrode active material being coated respectively onto aluminum foil and copper foil as substrate materials.

Figure 3:
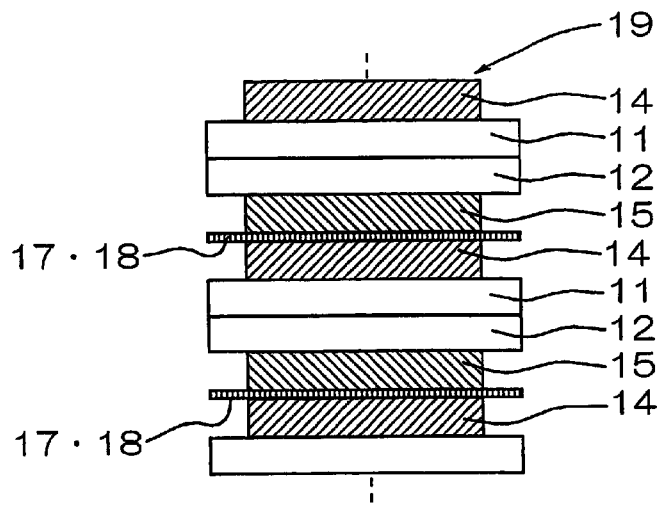
FIG. 3 is a (cross-)section view showing another embodiment of the structure of a lamination-type internal electrode body.
Figure 4:
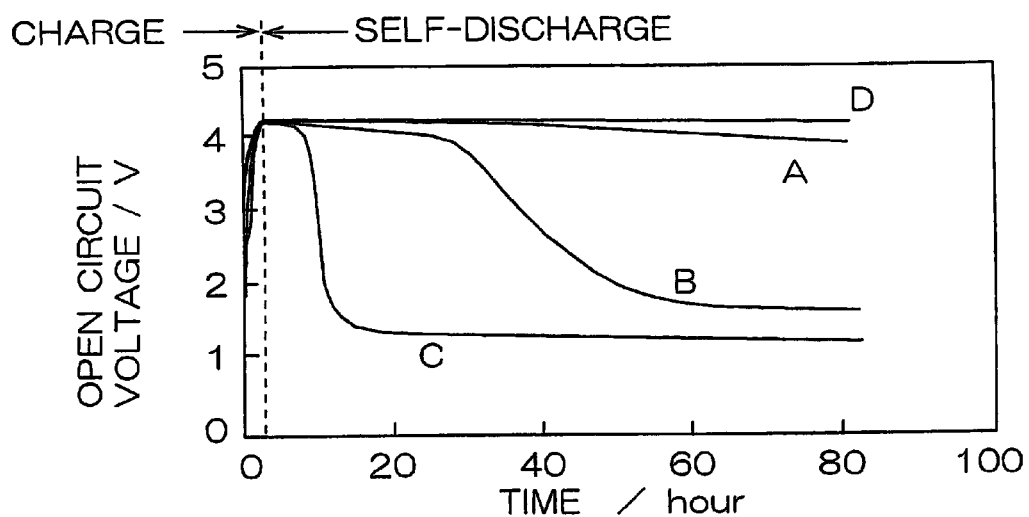
FIG. 4 is a graph showing self-discharge characteristic of a lithium secondary battery with various amounts of moisture mixed therein.

In contrast, the internal electrode body 19 with a laminate configuration shown in FIG. 3 is structured so that a positive active material layer 14 is formed on one surface of a positive substrate material 11 in the shape of a plate or a foil, while a negative active material layer 15 is formed on one surface of a negative substrate material 12, connecting electrically respective surfaces without electrode active material layers being formed thereon. The surface of a positive active material layer 14 and the surface of a negative active material layer 15 are laminated so as to oppose each other via a separator 17 or a solid electrolyte 18 to configure a plurality of steps. In this case, unlike the above-described internal electrode body 1, 7, the configuration of the internal electrode body 19 has element batteries connected in series.

For a battery with any of the above-described structures, lithium transition metal compound oxides such as lithium cobalt oxide ($LiCoO_2$), lithium nickel oxide ($LiNiO_2$), or lithium manganese oxide ($LiMn_2O_4$), etc. are generally used as positive active materials. In addition, in order to improve the conductivity of these positive active materials, it is preferable to mix with the electrode active material a carbon powder such as acetylene black, graphite powder, etc. On the other hand, for the negative active electrode, an amorphous carbon material such as soft carbon or hard carbon, or carbon powder such as natural graphite, etc. is used.

In addition, as a separator, it is preferable to use a three-layer structural separator in which a polyethylen film with lithium ion permeability and including micropores is sandwiched between porous polypropylene films having lithium ion permeability. This serves also as a safety mechanism in which when the temperature of the internal electrode body is raised, the polyethylene film is softened at about 130° C. so that the micropores collapse to suppress the movement of lithium ions, that is, battery reaction. When this polyethylene film is sandwiched between polypropylene films having a softening temperature higher than said polyethylene film, it is possible to prevent contact/welding between the positive and negative electrodes.

Such various internal electrode bodies 1, 7, and 19 are mounted within battery cases in accordance with their respective shapes. Here, as the electrolyte solution with which the internal electrode bodies 1, 7, and 19 are impregnated and which is filled in the battery cases, other than the above-mentioned EC, DEC, DMC, propylene carbonate (PC), γ-butyrolactone, tetrahydrofuran, and acetonitrile, etc. can be nominated. A nonaqueous organic electrolyte solution is preferably used, including a single solvent or a mixture solvent of these organic solvents, and one or more of the above-mentioned $LiPF_6$, etc., and lithium halide, etc., such as $LiClO_4$ as an electrolyte dissolved in the solvent. Further, it is also possible to use a macromolecular solid electrolyte or the like formed by gelating the thus formed electrolyte solution.

Next, in the present invention, decomposition of electrolyte is suppressed by making the moisture in the electrolyte solution be absorbed by zeolite, which features excellent absorption of moisture without being reactive with members or materials configuring a battery. The zeolite is incorporated within the battery case, within the thus-structured lithium secondary battery, so as to contact the organic electrolyte solution. Here, in many cases, zeolite is preferably used in a powder state in order to make the contact area with the electrolyte solution larger.

As one means to incorporate this zeolite into a battery there is, a means where the zeolite is contained in a bag having electrolyte solution as well as moisture permeability and the zeolite is never allowed to spill out, and said bag is disposed within the battery case. Here, if the bag where the zeolite is contained has the shape of a band, it is possible to fit it in a part of the internal electrode body. In that case, however, the distance between positive and negative electrodes is made longer, and thus there is a disadvantageous aspect such that the internal resistance of the battery increases. On the other hand, in the case of not fitting it into the internal electrode body, there is a disadvantage in that it is inferior to the means described below in terms of efficiency in absorbing moisture since the place where the bag is disposed is set at a local position such as the circumference of the internal electrode body. Thus, the present means are preferably used not on their own but together with other means.

As another means to incorporate zeolite into a battery, it is possible to mention a means whereby it is mixed into an electrode active material structuring a positive electrode and/or a negative electrode. In the case where the method of coating an electrode active material in a paste state from an original powder state onto a substrate plate of metal foil is adopted as a way of forming a positive electrode or a negative electrode, it is possible to easily incorporate zeolite uniformly within the internal electrode body that is considered to require moisture absorption in the battery case merely by adding a necessary amount of zeolite powder to the electrode active material when this paste is being formed.

Moreover, it is possible to incorporate zeolite uniformly within the internal electrode body, which is considered to require moisture absorption, by a means whereby zeolite is dispersed/stuck onto the surface of a separator film, and also by a means whereby zeolite is made into a fine powder to such a degree that it does not settle due to gravity and is instead dispersed in the electrolyte solution. Incidentally, the means to incorporate the above-described zeolite into the inside of a battery case can be adopted on their own or in combination.

Now, absorption of moisture in an electrolyte solution using the above-described zeolite is to be absorption fundamentally at a very low level of around less than several ten ppm of moisture density in the electrolyte solution, that is, under a low moisture pressure. Thus, it is necessary to select a zeolite which exhibits good absorption of moisture under such conditions.

Therefore, as a zeolite to be used in the present invention a zeolite of an aluminosilicate family having at least any structure of LTA type, FAU type, CHA type, or MOR type, and having an Al/Si ratio in the zeolite frame of equal to or less than 10, is preferably used.

Among these zeolites, for LTA types, the 3A(K-A) type and 4A(Na-A) type, or 5(Ca-A) type are preferably used, and for FAU types, the X(Na-X) type or Y(Na-Y) type is preferably used. In addition, the zeolite frame having an Al/Si ratio equal to or under 10 is preferable, since it is generally hydrophilic and has a superior absorption characteristic under a low moisture pressure.

Although the present invention is described in further detail by way of examples as follows, needless to say the present invention is not to be limited to the following examples.

EXAMPLES

A paste has been formed with a $LiMn_2O_4$ powder body having surface area of 1.4 $m^2/g$ based on the BET method as a positive active material, to which 4 wt % of acetylene black has been added to provide conductivity to it. Further, a polyvinylidene fluoride (PVDF) as a binder and a normal methylpyrrolidone (NMP) as a solvent are mixed therein. With this paste coated on both sides of 25-$\mu$m aluminum foil, a positive electrode is formed having an electrode planar shape with a length towards the winding direction of 3400 mm×a width of 200 mm.

On the other hand, a paste has been formed with a highly graphitized carbon fiber in the shape of a fiber with a diameter of approximately 5 $\mu$m, and a length of approximately 10 $\mu$m as a negative active material, to which 2 wt % of artificial graphite has been added to improve conductivity. Further a PVDF as a binder and an NMP as a solvent are mixed therein, and it is coated on both sides of 20-$\mu$m copper foil, and thereby a negative electrode is formed having an electrode planar shape with a length towards the winding direction of 3400 mm×a width of 200 mm.

The thus-formed positive electrode and negative electrode are wound with insulation provided by employing 210 mm-wide separators made of polyprophylene to from an internal electrode body. During formation of this internal electrode body, as a lead tab for electricity collection, an aluminum foil lead tab is connected to the positive electrode and a copper foil lead tab is connected to the negative electrode by ultrasonic-welding with an appropriate distance in between and on the respective side surfaces of the internal electrode bodies so that one of the electrodes is formed at one end of the internal electrode body. Incidentally, production of the foregoing positive and negative electrode and production of an internal electrode body proceed under a normal air atmosphere without taking any measures against low moisture.

Subsequently the above-described wound body is inserted into an aluminum pipe (a battery case) with an inside diameter of 48 mm and an outside diameter of 50 mm and a length of 260 mm within a globe box having a dew point of −80° C. and a bag made of the same substance as that forming the separator where in LTA-type zeolite powder (zeolum A-3 bulb-shape product produced by Tosoh Corp.) of 5 g at the lead tab was disposed at both ends of the internal electrode bodies. The negative lead tab is fitted into a battery terminal, the cap of which is further attached to the battery case, and the side of the negative terminal of the battery case is sealed.

Next, from the open side of positive terminal of the battery case, the electrolyte solution, a mixed solvent of EC and DEC where in electrolyte $LiPF_6$ is dissolved to yield 1 mol % density, is injected and the internal volume of the globe box is kept at a vacuous for two hours, allowing permeation of electrolyte into the battery. Thereafter the positive lead tub is fitted into the positive terminal of the battery, to which the cap of positive terminal is attached and sealed.

Ten batteries according to this example were formed. Discharge capacity, internal resistance, and self-discharge amount were measured for each battery. Here, charge and discharge were measured, employing a constant-current power source as the power source with a current intensity of approximately 0.2 C covering a range of 2.5 V to 4.2 V. The internal resistance was calculated based on the voltage drop at the terminals at the time of alternating to discharge after the initial charge. The self-discharge amount is calculated after measuring the initial discharge capacity at discharge immediately after the initial charge, and recharging immediately and leaving it stand at room temperature for 28 to 30 days. Thereafter, the discharge capacity was measured, with the difference between the discharge amounts before and after being let stand at room temperature being divided by the number of days of being left to stand. The test results shown in Table 1.

TABLE 1

Characteristic of Battery Related to Example

| Battery No. | Discharge Capacity (Ah) | Internal Resistance (mΩ) | Self-discharge Amount (%/day) | Battery Weight (g) | Quantity of Electrolyte (g) |
|---|---|---|---|---|---|
| 1 | 21.8 | 4.75 | 0.42 | 813 | 178 |
| 2 | 22.4 | 5.25 | 0.58 | 805 | 165 |
| 3 | 22.3 | 5.5 | 0.52 | 808 | 167 |
| 4 | 22.6 | 5.75 | 0.48 | 815 | 171 |
| 5 | 21.9 | 5 | 0.52 | 825 | 178 |
| 6 | 21.3 | 5.25 | 0.31 | 852 | 209 |
| 7 | 22.3 | 6.5 | 0.68 | 860 | 215 |
| 8 | 21.7 | 6.75 | 0.69 | 872 | 230 |
| 9 | 22.5 | 6.25 | 0.34 | 878 | 234 |
| 10 | 22.2 | 6.75 | 0.36 | 868 | 226 |
| Average | 22.1 | 5.78 | 0.49 | 840 | 197 |
| 1σ | 0.4 | 0.74 | 0.13 | 29 | 28 |

In comparison with the above-described example, a test similar to the example was conducted as an example for comparison adopting the same method as in the example of producing ten batteries with the exception that the zeolite powder was incorporated inside the battery case. The test results are shown in Table 2.

TABLE 2

Characteristic of Battery Related to Example for Comparison

| Battery No. | Discharge Capacity (Ah) | Internal Resistance (mΩ) | Self-discharge Amount (%/day) | Battery Weight (g) | Quantity of Electrolyte (g) |
|---|---|---|---|---|---|
| 11 | 22.5 | 5.5 | 1.01 | 822 | 177 |
| 12 | 22.5 | 5.75 | 1.01 | 858 | 213 |
| 13 | 22.3 | 6.25 | 1.1 | 823 | 182 |
| 14 | 22.5 | 6.75 | 0.78 | 847 | 202 |
| 15 | 22.5 | 8.25 | 1.01 | 851 | 208 |
| 16 | 22.4 | 8 | 0.93 | 864 | 220 |
| 17 | 22.4 | 6.5 | 0.93 | 844 | 199 |
| 18 | 22.3 | 6.5 | 0.93 | 879 | 233 |
| 19 | 22.5 | 7.5 | 0.92 | 838 | 194 |
| 20 | 22.6 | 6.25 | 0.84 | 853 | 208 |
| Average | 22.5 | 6.73 | 0.95 | 848 | 204 |
| 1σ | 0.1 | 0.92 | 0.09 | 18 | 17 |

As shown in Table 1 and Table 2, concerning the self-discharge amount, a result such that the amount for the battery for the comparative example reached approximately twice the level as that for the battery for the example in spite of the fact that the discharge capacity is almost similar in the batteries in the example and in the comparative example. Such a difference in self-discharge amount can be considered to have taken place as a result in which is the battery for the example, moisture mixed in various materials used to form the battery as well as moisture inside the battery case during the forming process of the battery was absorbed by zeolite, resulting in preventing the decomposition of the electrolyte, that is, maintaining the charge/discharge characteristic without degrading ionic conductivity.

As described above, according to the lithium secondary battery of this invention, zeolite performing well in terms of its moisture absorption characteristic even under a lower moisture pressure is incorporated inside the battery so as to be in contact with the organic electrolyte solution by a simple means, so that any moisture mixed into the electrolyte solution is limited to an extremely lower level. Thus deterioration of the charge-discharge cycle characteristic of the battery due to decomposition of electrolyte is suppressed, and the self-discharge characteristic is improved. Moreover, concerning the formation of a large-sized lithium secondary battery, there is an advantage in that a production facility, etc. having a large-scale dry nitrogen atmosphere becomes unnecessary and it becomes possible to suppress the production cost.

What is claimed is:

1. A lithium secondary battery comprising:
   a battery case;
   an internal electrode body contained in the battery case and including a positive electrode comprising lithium manganese oxide, a negative electrode comprising carbonaceous material and a separator film made of porous polymer, the positive electrode and the negative electrode being wound or laminated so that the positive electrode and negative electrode are not brought into direct contact with each other via the separator film,
   an organic electrolyte solution comprising $LiPF_6$ contained in the battery case, and
   a zeolite having a moisture absorption characteristic, which is incorporated in the battery case so that the zeolite is brought into contact with the organic electrolyte solution within the battery case, wherein the zeolite is of an aluminosilicate family having at least one structure selected from among LTA type zeolites and FAU type zeolites,
   wherein the zeolite is incorporated into the battery case using a means that disposes the zeolite to be contained in a bag permeable to electrolyte solution inside the battery case,
   whereby the zeolite absorbs moisture to reduce or prevent decomposition of $LiPF_6$ to separate out HP, thereby reducing or preventing dissolution of manganese from the positive electrode,
   said battery having a self-discharge amount of 0.69% per day or less.

2. A lithium secondary battery according to claim 1, wherein the LTA type zeolite is selected from among 3A (K-A) type, 4A (Na-A) type and 5 (Ca-A) type, and the FAU type zeolite is selected from among X (Na-X) type and Y (Na-Y) type.

3. A lithium secondary battery according to claim 2, wherein zeolite has an Al/Si ratio equal to or less than 10.

4. A lithium secondary battery according to claim 3, wherein the zeolite is incorporated into the battery case, using at least one of the following additional means:
   a means that mixes the zeolite with the electrode active material structuring the positive electrode and/or the negative electrode,
   a means that disperses the zeolite on the surface of the separator film, and
   a means that makes the zeolite into a fine powder and disperses it by suspension in the electrolyte solution.

5. A lithium secondary battery according to claim 2, wherein the zeolite is incorporated into the battery case, using at least one of the following additional means:
   a means that mixes the zeolite with the electrode active material structuring the positive electrode and/or the negative electrode,
   a means that disperses the zeolite on the surface of the separator film, and
   a means that makes the zeolite into a fine powder and disperses it by suspension in the electrolyte solution.

6. A lithium secondary battery according to claim 1, wherein the zeolite has and Al/Si ratio equal to or less than 10.

7. A lithium secondary battery according to claim 6, wherein the zeolite is incorporated into the battery case, using at least one of the following additional means:
- a means that mixes the zeolite with the electrode active material structuring the positive electrode and/or the negative electrode,
- a means that disperses the zeolite on the surface of the separator film, and
- a means that makes the zeolite into a fine powder and disperses it by suspension in the electrolyte solution.

* * * * *